Feb. 10, 1953 J. F. JOY Re. 23,618
LATERALLY FLEXIBLE MINE CONVEYER
Original Filed June 15, 1949 3 Sheets-Sheet 1
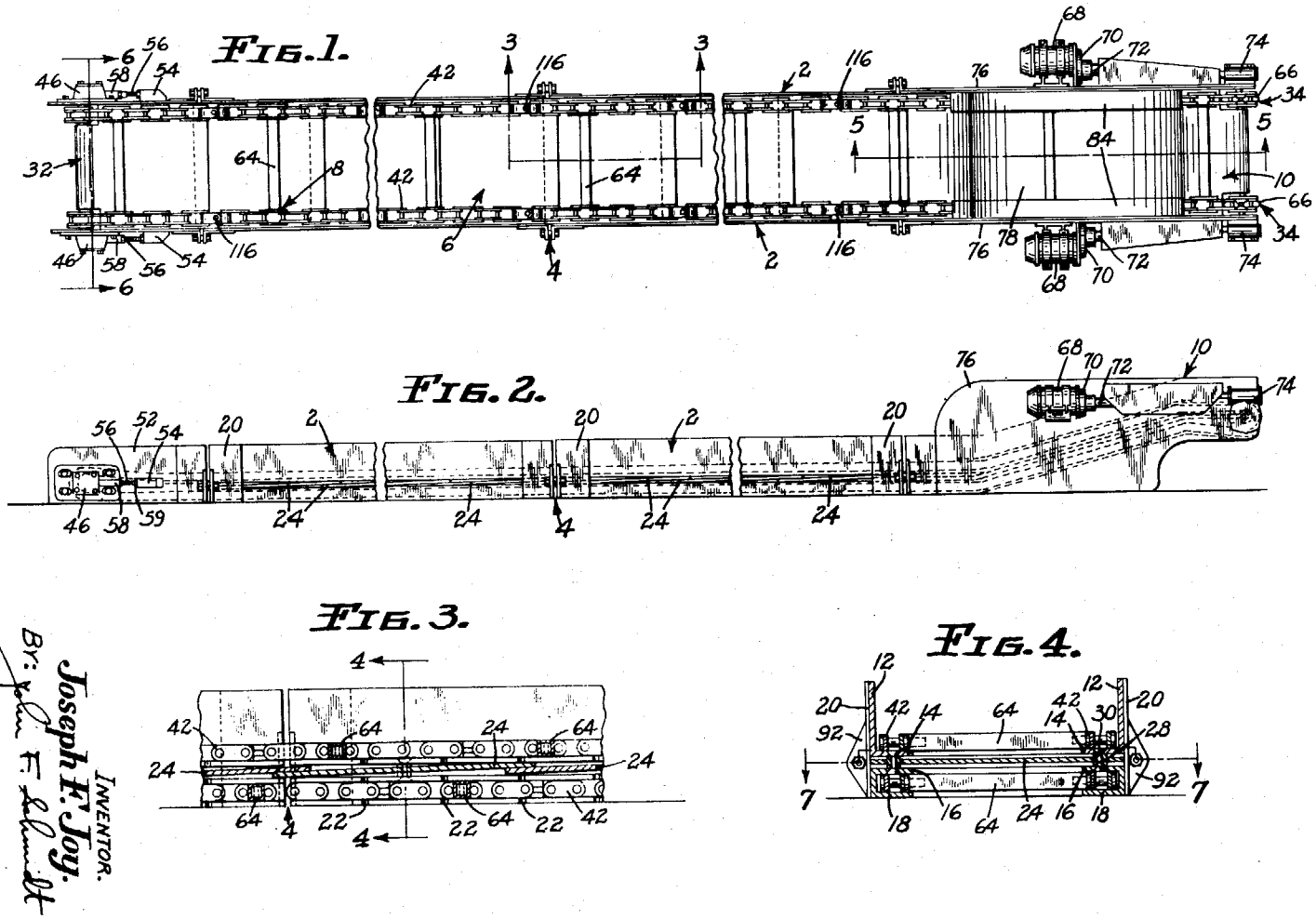
INVENTOR.
Joseph F. Joy.
BY: John F. Schmidt
ATTORNEY.

LATERALLY FLEXIBLE MINE CONVEYER

Original Filed June 15, 1949 3 Sheets-Sheet 2

INVENTOR.
Joseph F. Joy.
BY: John F. Schmidt
ATTORNEY.

LATERALLY FLEXIBLE MINE CONVEYER
Original Filed June 15, 1949 3 Sheets-Sheet 3
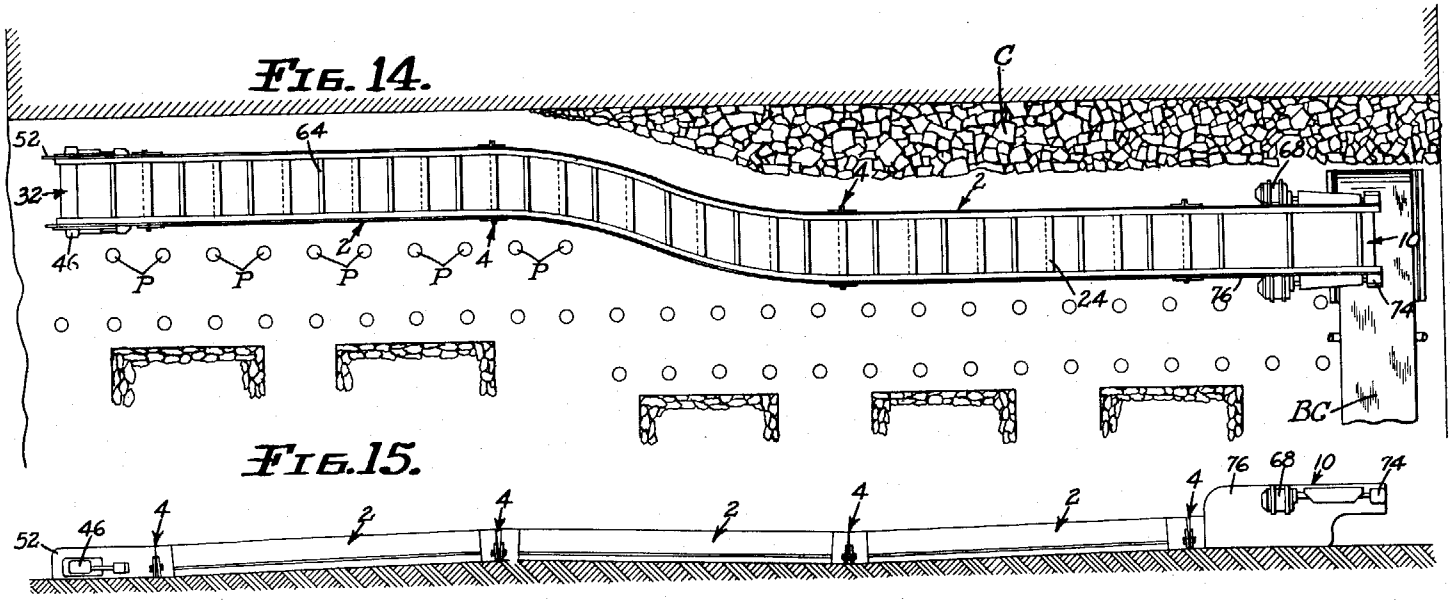
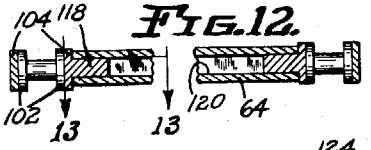
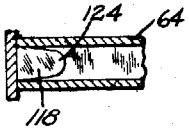
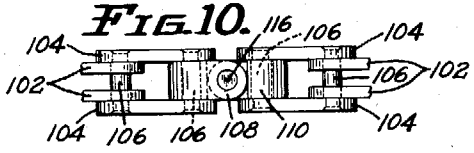
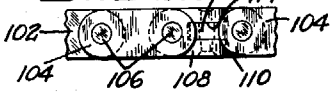
INVENTOR.
Joseph F. Joy.
BY: John F. Schmidt
ATTORNEY.

Reissued Feb. 10, 1953

Re. 23,618

UNITED STATES PATENT OFFICE 23,618

LATERALLY FLEXIBLE MINE CONVEYER

Joseph F. Joy, Pittsburgh, Pa., assignor to Joy Manufacturing Company, Pittsburgh, Pa., a corporation of Pennsylvania Original No. 2,569,004, dated September 25, 1951, Serial No. 99,291, June 15, 1949. Application for reissue December 12, 1951, Serial No. 261,310

24 Claims. (Cl. 198—109)

Matter enclosed in heavy brackets [ ] appears in the original patent but forms no part of this reissue specification; matter printed in italics indicates the additions made by reissue.

This invention relates to conveyors of the chain-and-flight or chain-and-scraper type, especially to a laterally flexible conveyor of that type designed for use in coal mines for conveying dislodged coal along the face of a coal seam.

In mining with ordinary conveyors having no lateral flexibility, it is customary to carry the conveyor in a straight line along the face. As coal is removed, it becomes necessary to place roof props or supports in front of such a conveyor with the result that, after a given fall has been removed from the coal face, a line of roof props has been set between the conveyor and the new face. With that practice, it becomes necessary to dismantle the face conveyor entirely in order to reposition it in proper relation to the new face.

It is, accordingly, an object of this invention to provide a laterally flexible mine conveyor of the chain-and-scraper type which will permit lateral movement of the conveyor toward the new mine face as the loose coal of a given fall is removed along the face, obviating the necessity of placing roof props between the face and the conveyor.

This and other objects are accomplished in a mine conveyor having a rigid drive head, a rigid tail section, laterally flexible side supports extending between the drive head and the tail section and secured thereto, and suitable means for spacing the side supports between their ends, in which the spacing means are preferably deck plates over which the flights move as they convey material such as coal along the mine face. The side supports are preferably angle-and-channel-shaped members, and in the preferred embodiment each side support consists of an angle above a channel and spaced therefrom such that the deck plates lie in the space between the angle and the channel.

In the drawings:

Fig. 1 is a top plan view of a conveyor embodying the invention.

Fig. 2 is a side elevation view of the conveyor.

Fig. 3 is a view in section on line 3—3 of Fig. 1.

Fig. 4 is a view in section on line 4—4 of Fig. 3.

Fig. 10 is a top plan view of a portion of the conveyor chain showing one of the joints which makes the chain flexible about a vertical axis.

Fig. 11 is a side elevation view of the chain portion shown in Fig. 10.

Fig. 12 is a section through the conveyor chain and one of the flights disclosing the feature which allows the flight a limited amount of endwise and rocking movement.

Fig. 13 is a view in section on line 13—13 of Fig. 12.

Fig. 14 is a top plan view illustrating the lateral flexibility of the conveyor; and Fig. 15 is a side elevation view illustrating the vertical flexibility of the conveyor.

Figure 5:
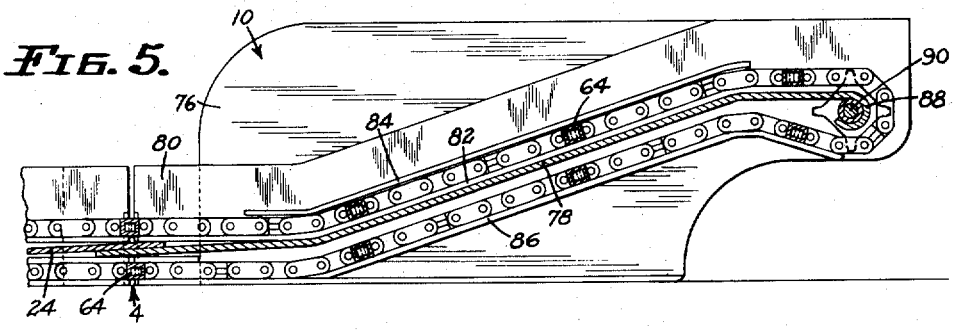
Fig. 5 is a view in section on line 5—5 of Fig. 1.

A conveyor made according to *an illustrative embodiment of the* [this] invention consists of: pairs of laterally flexible side supports 2 which are comparatively resistant to vertical bending forces, but which are joined together at 4 in such a manner as to permit limited vertical bending of two or more such supports joined together end to end; a flexible deck indicated generally at 6 which extends between the side supports and is secured thereto; a chain conveyor indicated generally at 8, movable along the deck; and a drive or elevating head 10, provided to enable ready emptying of the coal into shuttle cars, mine cars, another conveyor, or the like.

Referring now to the various elements of the invention in greater detail, each side support 2 in the embodiment shown is made up of an angle having an upright arm 12 and another arm 14 which is substantially horizontal and extends inward toward the opposite side, forming thus a projection which [consistutes] *constitutes* mounting means for the flexible deck. Another element of the side support, spaced from the angle, is a channel member so disposed that its sides 16 and 18, like the arm 14, project inward toward the opposite side. The angle and channel are securely held together by means of end plates 20 by any suitable means, as for example by welding.

Figure 7:
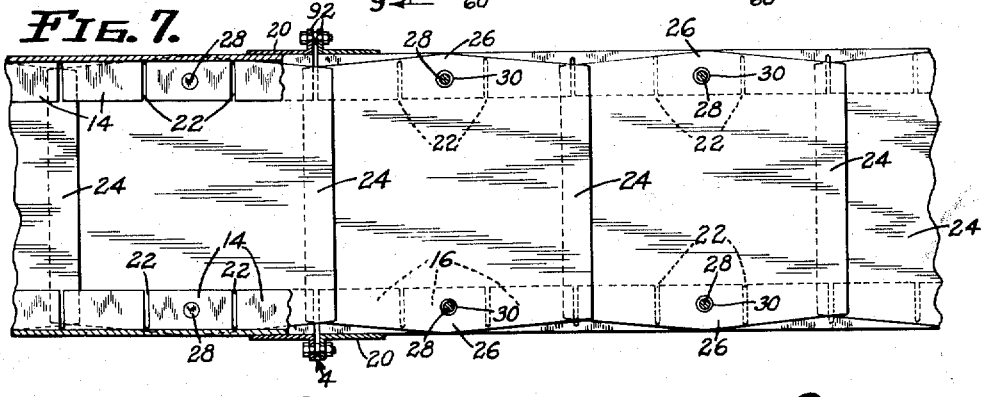
Fig. 7 is a view in section substantially on line 7—7 of Fig. 4.

As is best seen in Figs. 3 and 7, each of the projections 14, 16, and 18 is transversely recessed at spaced intervals as shown at 22. Between each pair of adjacent recesses 22, each projection 14, 16 and 18 is resistant to bending forces in a horizontal plane, but an entire support is laterally flexible, or yieldable to such horizontal bending forces, by virtue of its numerous recesses 22.

The flexible deck referred to above consists of a plurality of overlapping deck plates 24, the overlap being in the normal direction of movement of coal along the conveyor. Each deck plate 24 is narrower at its ends than at a point between the ends. More specifically, each deck plate tapers toward its ends from a point 26 substantially midway between its ends. The deck plate is secured by a mounting pin 28 to the inward extending projections 14 and 16. The angle and the channel members are secured together in spaced apart relation such that the arm 14 is spaced from the side 16 sufficiently to allow the overlapping deck plates to lie in said space. The pins 28 are preferably made in the form of countersunk rivets which engage the arm 14 of the angle and the side 16 of the channel. The mounting pin preferably is disposed in a spacer bushing 30 which lies in a suitable opening in the deck plate near the edge thereof, opposite its widest point 26.

Figure 6:
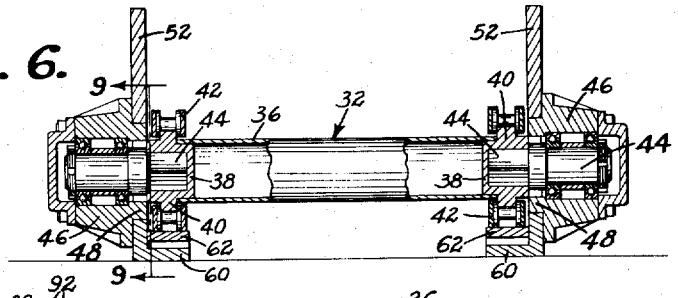
Fig. 6 is a view in section on line 6—6 of Fig. 1.
Figure 9:
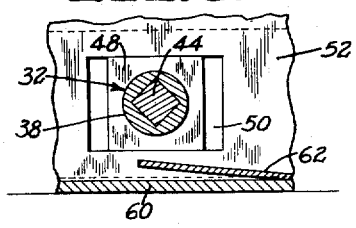
Fig. 9 is a view in section on line 9—9 of Fig. 6.

The chain conveyor 8 referred to above is preferably an endless conveyor of the chain-and-flight or chain-and-scraper type. To accommodate the chain conveyor, rotatable members 32 and 34 are provided at the extreme ends of the apparatus. The rotatable member 32 may consist of a hollow cylindrical member 36 (Fig. 6) engaging at its ends chain guides 38 which are provided with peripheral flanges 40 to engage the links of chain 42. As is best seen in Fig. 9, the chain guides 38 are preferably provided with square openings or sockets to engage the square ends of stub shafts 44. These shafts are mounted for rotation in antifriction bearings located in bearing housings 46.

Each bearing housing 46 is provided with a rectangular boss 48 (Fig. 9) which is slidable in a rectangular recess 50 in a tail section 52 secured to the end of the last side support. A nut 54 is secured as by welding to the side of the tail section and is threaded to receive an adjusting screw 56, the head of which abuts against a block 58 on the bearing housing 46. A lock nut 59 holds the screw 56 in any position to which it may be adjusted. The tail section 52 is provided at its lower edge with inward-extending ground-engaging flanges 60. Sloping chain guide plates 62 may be provided just ahead of the rotatable member 32; see especially Fig. 9.

The upper or work run of the chain conveyor is supported on the arms 14 of the angles, as is best seen in Fig. 4, which shows the chains 42 being supported on the upper faces of the inward-extending arms 14. Flights 64 extend between the two chains 42 and serve to push the coal along the deck. The forward rotatable member 34 consists preferably of a pair of sprockets 66 which engage the chains of the conveyor. The lower or return run of the conveyor is supported in the channels, as is best seen in Fig. 4, wherein the chains are shown as lying between the sides 16 and 18.

Drive means for the conveyor are provided, preferably in the form of any suitable means for driving one of the rotatable means, here shown as electric motors 68 connected by suitable gear trains 70, drive shafts 72 and worm gear trains 74. Thus, the sprockets 66 are driven by the electric motors and in turn drive the conveyor chains.

It will be evident to those skilled in the art that a portion of the objects of this invention may be accomplished simply with a single pair of side supports 2 having a rotatable member 32 at one end and a driven rotatable member 34 at the other end. Such a conveyor would have the desired lateral flexibility and would thus accomplish some of the objects of this invention. In the preferred form, however, the apparatus is provided with the elevating or drive head 10 referred to above, and the rotatable means 34 and an electric motor drive therefor are mounted on the drive head.

As is best seen in Figs. 1, 2 and 5, the drive head consists of side support members 76 and the floor or ramp 78 extending between the side support members. Reinforcing rails 80 corresponding to the side supports 2 may also be provided. The tail end of the ramp 78 is turned downward to underlie the forward end of the foremost deck plate 24. An inward-extending projection 82 corresponds to the inward-extending arm 14 and serves to support the chains of the upper run of the chain conveyor. A hold-down flange or projection 84 is provided and is secured to the member 80 to prevent straightening out of the conveyor chains where the conveyor runs up the ramp 78. A suitable flange 86 below the ramp 78 serves to support the lower or return run of the conveyor. At its forward end, the ramp 78 curves downward and back upon itself as shown at 88 and engages a transverse rod 90.

Figure 8:
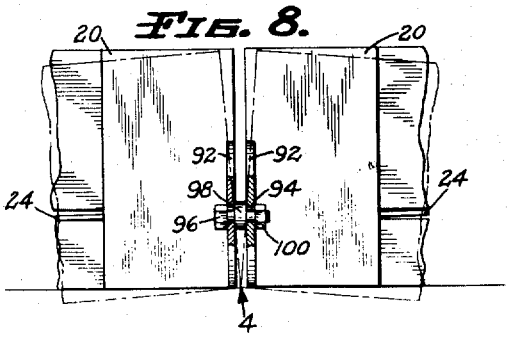
Fig. 8 is an enlarged side elevation of a portion of the conveyor with parts broken away and in section to show details of the means which join adjacent ends of two side supports.

As was pointed out above, a laterally flexible conveyor is provided simply by the use of a single pair of side supports 2. However, the apparatus can also be made vertically flexible by joining two or more pairs together as indicated at 4. As is best seen in Figs. 7 and 8, the joint 4 consists of outward-extending flanges or ears 92 provided at the adjacent *edges* [ends] of end plates 20. Ears 92 are provided with openings 94 which receive bolts 96. The openings 94 are slightly larger than the bolts 96 in order to give a limited amount of flexibility to the joint. Spacer washers 98 are placed between adjacent ears 92 and are preferably provided with rounded corners to allow the ears to rock about the washers. Nuts 100 on the bolts hold the assembly together.

In order to provide a substantial degree of lateral flexibility, the conveyor chain is preferably provided with an occasional link which permits pivoting about a vertical axis. Such a link is shown in Figs. 10 and 11 and one such link will preferably be placed between each pair of adjacent flights 64.

As is shown in Figs. 10 and 11, the chain comprises links 102 and 104, which are connected together by the usual horizontal pivot pins 106. Between two adjacent pairs of *more* widely spaced apart links 104, there is disposed a pair of blocks 108 and 110. These blocks are also secured to links 104 by horizontal pivot pins 106. Blocks 108 and 110 are provided with a tongue and groove joint, the block 110 having a tongue 112 and the block 108 being provided with the groove 114. A vertical pivot pin 116 passes through the blocks 108 and 110 and completes the joint.

Figs. 12 and 13 disclose details of a feature which permits limited endwise movement of each flight of the chain. As is seen in these figures, the chain flight 64 is supported at its ends on tongues 118, which are disposed in the ends of the hollow interior 120 of the flights. Each tongue 118 is mounted on a chain link 104 and is rounded as shown at 124 to *permit* [provide] limited rocking movement of the tongue with respect to the flight. Thus, too, the flight "floats" on its end supports for a limited amount of lateral movement. Furthermore, if a flight is bent for any reason, it merely drops out of the chain.

It will be understood by those skilled in the art that some of the objects of the invention may be realized by the employment of only one or two of the inward-extending projections instead of all three projections 14, 16 and 18. Thus, the invention could be practiced with a single such projection supporting the flexible deck which might be either 14 or 16. In the preferred form, however, the invention embodies the three projections shown for the purposes set forth herein.

Operation

The operation of the chain-and-flight conveyor will already be well understood by those skilled in the art and need not be detailed here. Lateral flexibility of the conveyor is provided by the recesses 22 and the tapered ends of the deck plates whereby the deck plates and the side supports pivot relative to each other about the mounting pins 28. The degree of flexibility is limited by the width of the recesses 22, the angle of taper of the deck plates, and the distance between recesses. However, even with relatively narrow recesses and a relatively slight taper, the angle of lateral fixibility for apparatus of this type is adequate, inasmuch as it is not contemplated that the apparatus shall be used to turn sharp corners Thus, the lateral flexibility makes the apparatus yieldable to bending forces in horizontal planes, permitting the apparatus to take a shape somewhat as illustrated in Fig. 14.

As is evident from that figure, a conveyor made according to the invention can be used to great advantage, especially in longwall mining. The conveyor is located adjacent the mine face right beside a fall of coal C. As the loose coal is loaded onto the conveyor, the conveyor is moved over next to the face, and props P are put in to hold up the roof. It is thus unnecessary to put a row of props between the face and the conveyor, thus eliminating the need to disassemble the entire conveyor and reassemble it next to the face.

Coal carried away by the laterally flexible conveyor may be discharged onto any suitable transporting means, as for example a belt conveyor such as is shown at BC in Fig. 14.

With the structure shown, consisting of the rigid ends (head and tail section) and the flexible, spaced side supports, there is provided a *structure* [linkage] which, when deflected laterally, takes the shape of an S-curve. That shape is advantageous for the intended purpose because it keeps the ends of the conveyor oriented along parallel axes, even though one end be laterally displaced from the other end.

Vertical flexibility, whereby the apparatus is yieldable to bending forces in vertical planes, is provided by the joints 4, as can be seen in Fig. 15. Although each side support by itself is relatively rigid to vertical bending forces, two side supports joined together by the joint 4 may bend somewhat depending upon the width of the space between adjacent ears 92 and upon the distance between joints 4. Again, it is not contemplated that the apparatus will be required to conform to sharp bends but instead it is merely contemplated that some degree of vertical flexibility be provided to accommodate slightly uneven mine bottoms or other floors or ground supports where the apparatus may be used.

It will be evident to those skilled in the art that this invention provides a conveyor which has a distinct advantage over the conventional rigid and unyielding apparatus which must be blocked up at various places to make up for irregularities in the ground support, and which cannot be moved closer to the face until the entire fall of coal has been cleared away, and then at considerable inconvenience and expense. A conveyor made according to this invention gives the desired flexibility in a relatively simple device which is easily and inexpensively manufactured.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In a conveyor of the chain-and-flight type, a rigid drive head, a rigid tail section, laterally flexible side supports secured to the drive head and to the tail section, *extending continuously between them* and spaced apart at their ends thereby, and means *including deck plates pivotally engaged at their opposite sides with said side supports* to space the side supports between their ends, whereby lateral flexure of the conveyor causes it to form an S-shaped curve.

[2. A conveyor according to claim 1, in which the last-named means consist of deck plates each of which is narrower at its ends than at a point along a side edge between the ends.]

3. In a conveyor of the chain-and-flight type having a *laterally* rigid *discharge end* [drive head], a *laterally* rigid *receiving end* [tail section], and intermediate laterally flexible sections, in combination, a pair of laterally flexible side supports spaced apart at their ends by the *discharge end* [drive head] and the *receiving end* [tail section], and a plurality of deck members *each pivotally* secured to *both of* the side supports *and having its relation to others of said deck members established wholly through the connections of said deck members with said side supports.*

4. A conveyor according to claim 3, in which the side supports consist of angle and channel members having spaced slots in their horizontal arms.

5. A conveyor according to claim 4, in which the deck members consist of tapered plates pivotally secured at their widest parts to the side supports.

6. A conveyor according to claim 3, in which the deck members consist of tapered plates pivotally secured at the widest parts to the side supports.

7. In a conveyor of the chain-and-scraper type having a discharge end, a tail section, and intermediate laterally flexible sections, in combination, a pair of opposed angle side supports, the horizontal arms of which are slotted at intervals to provide lateral flexibility of the conveyor, a plurality of *structurally independent* tapered deck plates extending between said side supports in overlapping relation *and each having connection only with said side supports,* and means to secure the deck plates to one arm of each of the said side supports.

8. A conveyor according to claim 7, in which the last-named means consists of a pin passing through each side of each deck plate at its widest point and securing the plate to an angle arm of said support.

9. In a conveyor of the chain-and-scraper type having a discharge end, a tail section, and intermediate laterally flexible sections, in combination, side supports, each of which consists of an angle and a channel one above the other with the channel sides and an angle arm directed toward the opposite side of the conveyor, means to space the angle above the channel, the channel sides and the horizontal angle arm being slotted at intervals to provide lateral flexibility; and a plurality of deck plates extending from side to side and having their edges lying in the defined space and secured to adjacent angle and channel members.

10. A conveyor according to claim 9, in which the deck plates are tapered toward each end from a point of maximum width near the middle, and overlap in the direction of movement of material.

*11. An elongated room conveyor especially designed for use in mines comprising, in combination, a frame section disposed at one end of the conveyor, a frame section disposed at the opposite end of said conveyor, an intervening frame structure section connected to said end sections and comprising elongated laterally flexible side members extending from one to the other of said first two frame sections and which, when said conveyor is disposed in a position wherein it is straight from end to end, are disposed in parallelism, said end sections and said intervening section adapted to rest upon and to be repositioned at will upon the floor of a mine, said intervening section also including cooperating elements pivotally connected on upright axes to and which cooperate with said parallel side members to provide a troughlike guideway for an endless conveyor, and an orbitally moving endless conveyor guided for circulation along said troughlike guideway of said intervening section and along said end sections, said end sections providing guiding means for said endless conveyor at the opposite ends of its orbit, and said guiding means and said guideway serving to guide said endless conveyor for circulation in a vertical orbit, said endless conveyor comprising laterally flexible conveyor elements whereby said conveyor may be deflected laterally with said flexible side members, and said flexible side members and said conveyor being laterally deflectible into a generally S-shaped curve.*

*12. A conveyor as set forth in claim 11, wherein said cooperating frame elements of said intervening section comprise a series of overlapping plates each having pivotal connections at its sides with said laterally flexible side members.*

*13. A conveyor as set forth in claim 11, wherein the side members of said intervening section consist of a series of frame elements connected end to end, and connecting means is provided between said sections whereby the latter may flex slightly in vertical planes.*

*14. A conveyor as set forth in claim 11, wherein said elongated laterally flexible side members are normally straight and inherently resilient.*

*15. In a conveyor of the chain-and-flight type, a trough structure having a plurality of elements providing spaced laterally rigid portions having their center lines parallel to a common straight line, laterally flexible side portions extending between said rigid portions, and deck plates operatively pivotally connected with said side portions to maintain, upon lateral flexure of said side portions, parallelism of the longitudinal center lines of said rigid portions with said common straight line.*

*16. A flexible trough construction for a flight conveyor including elongated laterally flexible side supports of equal overall lengths, means for rigidly spacing said side supports adjacent one end of the latter, means for rigidly spacing said side supports adjacent their other ends, and means including a plurality of elements forming links pivotally engaging said side supports for maintaining equal spacing, throughout the length of said side supports, between all corresponding points in said side supports upon displacement of one end of said trough construction out of line with the other.*

*17. In a conveyor of the chain-and-flight type, a trough structure having spaced, laterally rigid portions having their central longitudinal lines parallel to a common straight line, laterally flexible side portions extending between said rigid portions and fixedly connected at each end thereto, and means forming a deck over which material may be moved longitudinally between said side portions and cooperating pivotally with the latter, as relative lateral bodily movement between said laterally rigid portions is effected, to preclude, upon attendant lateral flexure of said side portions, movement out of parallelism of the longitudinal center lines of said rigid portions with common straight line.*

*18. In a conveyor of the chain-and-flight type, elongated flexible side elements forming lateral edges of a trough structure and having rotatable chain guiding elements at the opposite ends thereof rotatable on parallel axes, and means for connecting said side elements including a plurality of strut-forming elements of equal lengths extending between mutually opposite points in said side elements and having connections with the latter providing for relative pivotal movement on parallel upright axes, straight lines extending between each pair of mutually opposite points all being parallel to the parallel axes of rotation of said rotatable chain guiding elements.*

*19. In a conveyor of the chain-and-flight type, in combination, end sections having rigidly spaced parallel side wall portions, elongated intermediate flexible side elements each connected at one end to one of said side wall portions on one of said sections and at its other end to the corresponding one of said side wall portions on the other of said sections, said flexible side elements of equal and substantially constant length in all laterally flexed positions thereof and each of said side wall portions and each of said flexible side elements being parallel to a straight line bisecting said conveyor longitudinally when the latter is unflexed laterally, and means coacting with said flexible side elements and relative to which the latter are pivotable for maintaining identity of curvature between them upon lateral flexure thereof and precluding departure of the longitudinal center lines of said end sections from parallelism to a common straight line.*

*20. In a conveyor of the chain-and-flight type, end supports each carrying a rotatable chain-engaging element, flexible side elements spaced laterally from each other and each connected at one end to one of said end supports and at its other end to the other of said end supports, said rotatable chain-engaging elements rotating on parallel axes, said flexible side elements in unflexed condition being substantially rectilinear and extending perpendicular to the axes of rotation of said rotatable chain-engaging elements, and means forming spacing connections of uniform length extending between said*

*flexible side elements and pivotally connected with the latter at pivot points pairs of which, including one with each flexible side element, lie in lines parallel to the axes of rotation of said rotatable chain-engaging elements.*

*21. In a conveyor of the chain-moved flight type, a trough structure comprising a bottom which includes a series of plate sections each overlapping at one end an adjacent plate section and each underlying at its other end another plate section, and flexible lateral wall elements, with each of which each of said plate sections is pivotally connected at a point spaced from its own ends, the points of connection of each plate section with said flexible lateral wall elements determining a straight line and all such straight lines being parallel in all positions of adjustment of said trough structures.*

*22. In a conveyor of the chain-moved flight type, a trough structure of which an extended length consists of flexible side portions spaced uniformly from each other and having a bottom made up of coacting plates, each plate pivotally connected with both side portions, the distances apart of such points of connection being the same, on all of said plates, and the points of connection of each plate with said side portions being directly opposite each other, whereby said conveyor flexes substantially as if made up of parallelograms having equal bases, but of varying altitude as flexure of said conveyor occurs.*

*23. A conveyor according to claim 1, in which each of the deck plates is narrower at its ends than at a point between the ends thereof.*

*24. In a conveyor of the chain-and-flight type, a rigid drive head, a rigid tail section, laterally flexible, resilient side supports extending, when said head and tail section are in line with each other, parallel with each other, and secured in fixed spaced relation, at their points of connection therewith, to said head and tail section, and a plurality of spacer elements extending between said side supports and having connections with the latter at mutually opposite points providing for relative pivotal movement about upright axes.*

*25. In a conveyor of the chain-and-flight type, a drive head, a tail section, said head and said tail section disposable in alinement with each other and having laterally rigid portions at their mutually adjacent ends, a plurality of transversely extending strut-forming elements each having pivot-forming means at its opposite sides, the pivot-forming means on each element in a line parallel to the lines in which the pivot-forming means on the other elements are disposed, and laterally spaced side supports with which said pivot-forming means cooperate secured to and spaced apart by said rigid portions.*

JOSEPH F. JOY.

REFERENCES CITED

The following references are of record in the file of this patent or the original patent:

UNITED STATES PATENTS

| Number | Name | Date |
|---|---|---|
| 793,557 | Adams et al. | June 27, 1905 |
| 1,800,428 | Bebinger et al. | Apr. 14, 1931 |
| 1,917,134 | Levin | July 4, 1933 |
| 1,987,262 | MacEachen | Jan. 8, 1935 |
| 2,250,933 | Manierre | July 29, 1941 |
| 2,388,385 | Cartlidge | Nov. 6, 1945 |
| 2,512,610 | Cartlidge | June 27, 1950 |
| 2,525,555 | Manierre | Oct. 10, 1950 |
| 2,543,368 | Jones | Feb. 27, 1951 |